United States Patent [19]
Edmondson

[11] Patent Number: 4,510,730
[45] Date of Patent: Apr. 16, 1985

[54] APPARATUS FOR SEAL-TESTING SACHETS, PACKETS AND THE LIKE

[75] Inventor: Alan S. Edmondson, Hinckley, England

[73] Assignee: Hulbritt Developments Limited, Leicestershire, England

[21] Appl. No.: 348,756

[22] Filed: Feb. 16, 1982

[30] Foreign Application Priority Data

Dec. 18, 1981 [GB] United Kingdom ............... 8138256

[51] Int. Cl.³ .............................................. B07C 1/10
[52] U.S. Cl. ........................................ 53/53; 73/49.3; 209/602
[58] Field of Search ............... 53/53, 52; 209/602, 209/604, 600, 598; 73/45.4, 49.3

[56] References Cited

U.S. PATENT DOCUMENTS

| | | | |
|---|---|---|---|
| 3,359,702 | 12/1967 | Beert et al. | 209/604 X |
| 3,415,369 | 12/1968 | Hennig | 53/53 X |
| 3,517,477 | 6/1970 | Thornton | 53/53 |
| 4,024,956 | 5/1977 | Cassidy | 74/49.3 X |
| 4,148,213 | 4/1979 | Prakken | 73/45.4 |

FOREIGN PATENT DOCUMENTS 2059381 4/1981 United Kingdom ................... 53/53

*Primary Examiner*—James F. Coan
*Attorney, Agent, or Firm*—Darby & Darby

[57] ABSTRACT

Apparatus for seal-testing packages to enable only sealed packages to be processed. The apparatus includes one or more carrier devices for receiving packages at a receiving station and carrying them to a delivery station. Each carrier device receives a package between a pair of opposed pressure members, means being included to close the pressure members and hence compress the package during passage from the receiving station. A detector produces an output signal in the event that the pressure members have been closed by more than a predetermined amount when the carrier device reaches the delivery station.

10 Claims, 4 Drawing Figures

APPARATUS FOR SEAL-TESTING SACHETS, PACKETS AND THE LIKE

This invention relates to apparatus for seal-testing packages such as sachets, packets and the like.

In the packaging industry, it is often preferred to use as the packaging medium sachets or packets which are hermetically sealed, particularly in the case where foodstuffs are being packaged. Such sachets or packets not only minimise deterioration of their contents but also prevent the latter from being affected by external contaminants. It is desirable that the effectiveness of the hermetic seal is tested before the sachets or packets are passed on for further processing. Conventionally, this is performed by passing the sachets or packets sequentially through a testing station where they are impacted by a pressure member and tested for any air escaping from the interior under the effect of the impact. This technique is however disadvantageous, on the one hand because the impact can damage the contents of the packet or sachet, and on the other hand because the pressure member does not remain in contact with the sachet or package long enough for a pin-hole leaks to be detected.

It is an object of the present invention to overcome these disadvantages.

According to the present invention, there is provided apparatus for seal-testing packages, comprising a receiving station at which said packages are received for testing, a delivery station at which the tested packages are delivered from the apparatus, at least one carrier device operative to receive said packages at the receiving station and carry same to the delivery station, the or each carrier device including a pair of opposed pressure members between which a package is received in use, moving means operative during movement of the or each carrier device between the receiving and delivery stations to effect relative movement between said pair of opposed pressure members such that said package is compressed therebetween, and detection means operative to produce an output signal in the event that said pair of members have moved towards one another by more than a predetermined amount by the time the respective carrier device reaches the delivery station.

Preferably, the apparatus includes a plurality of carrier devices which are moved in succession along a closed path. For example, the carrier devices may be carried by a rotor, with the receiving and delivering stations being angularly spaced about the rotation axis of the rotor.

Advantageously, the moving means includes a fixed cam surface, and a cam follower is operatively coupled to the or each carrier device so as to offset relative movement between the pressure members as it moves along the cam surface.

In the or each carrier device, one of the pair of pressure members may be fixed, with the other being movable towards and away therefrom. Moreover, at least one of the pressure members may be divided into two independently movable parts which are positioned so as to engage a package or spaced locations thereon, in which case the detection means is operative to produce said output signal in the event that any one of said parts moves by more than a predetermined amount.

Conveniently, the detection means is in the form of an optical detector, and the or each carrier device includes an indicator member having a part which is arranged to break a light beam of the detector in the event that the pressure members move towards one another by more than said predetermined amount.

The testing apparatus may also comprise a rejection station, separable from the delivery station, at which a rejection device moves the pressure members of the or each carrier device away from one another to release the package therebetween in response to said output signal from the detection means. The rejection station is preferably disposed between the receiving and delivery stations in the direction of travel of the carrier device or devices. Desirably, the rejection device includes a member past which the or each carrier device travels and which operatively engages at least one of the pressure members to move the latter apart in response to said output signal from the detection means. Where the detection means and the rejection device are spaced apart in the direction of travel of the carrier device or devices, operation of the rejection device is delayed until it is reached by the carrier device which has operated the detection means.

The invention will now be further described, by way of example, with reference to the accompanying drawings, in which.

The illustrated apparatus is designed to seal-test hermetically closed sachets or packets. For the purpose of the ensuing description, it will be assumed that sachets containing a foodstuff (such as an edible snack product) are being tested, although it will be appreciated that the apparatus is applicable to any sachets or packets where the effectiveness of the hermetic seal is to be checked.

Figure 1:
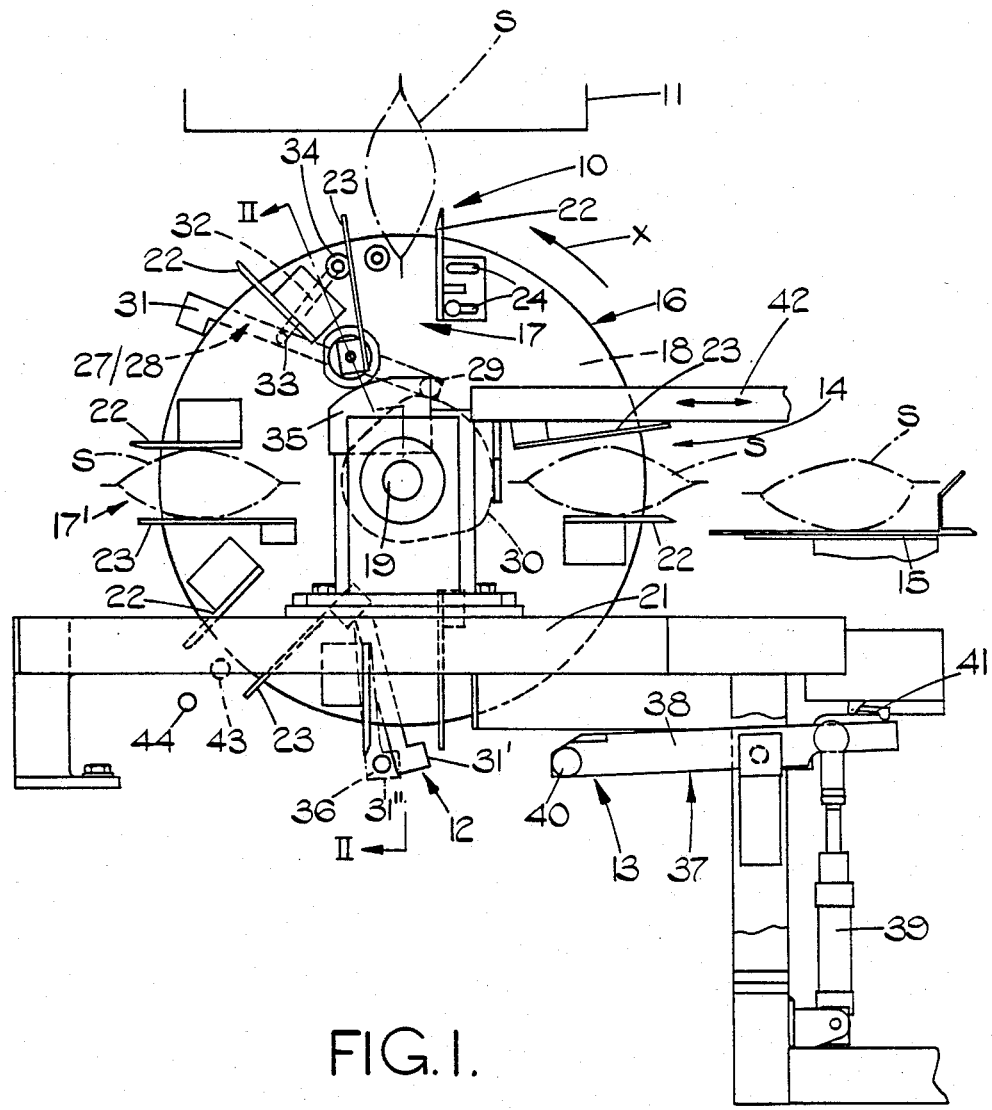
FIG. 1 is a diagrammatic view of testing apparatus according to the present invention.
Figure 2:
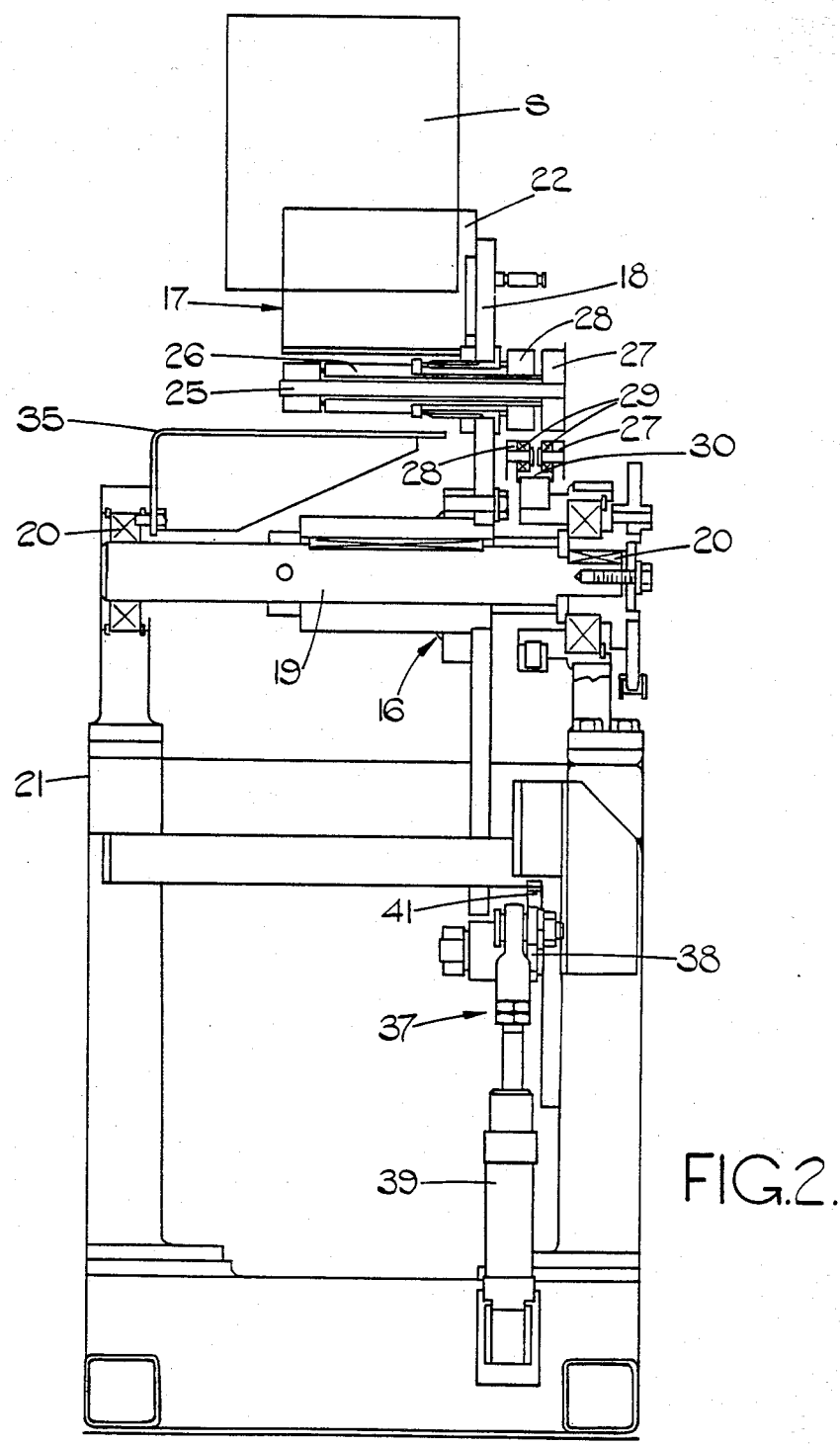
FIG. 2 is a section taken generally along the line II—II in FIG. 1.

Referring first to FIGS. 1 and 2, the testing apparatus comprises generally a receiving station 10 where sachets S are received for testing from a packaging and sealing machine 11, a detection station 12 where the sachets are checked for the effectiveness of their seals, a rejection station 13 where those sachets falling the seal test are rejected, and a delivery station 14 where the sachets passing the seal test are delivered to a checkweigher 15. The various stations are disposed in angularly spaced relation about the outer periphery of an indexable rotor 16 which supports a plurality of carrier devices 17 in equi-angularly spaced relation. For the sake of simplicity, not all of the carrier devices are shown. As the rotor 16 is indexed in the direction of arrow X in FIG. 1, the carrier devices 17 in succession receive a sachet S from the machine 11 and carry it past the detection station 12 to either the rejection station 13 or the delivery station 14, as the case may be.

More specifically, the rotor 16 is composed of a circular plate 18 which is keyed for rotation with a shaft 19, the shaft being received by bearings 20 on a fixed frame 21. The carrier devices 17 are all mounted on the same side of the rotor plate 18, and each comprises a pair of pressure members 22 and 23 between which the sachet is received. The pressure member 22 is fixed relative to the rotor plate 18, although it can be adjusted in a circumferential direction by means of slot-and-bolt arrangements 24. The pressure member 23 is, in contrast, pivotable relative to the rotor plate 18 in a direction towards and away from the member 22.

Figure 3:
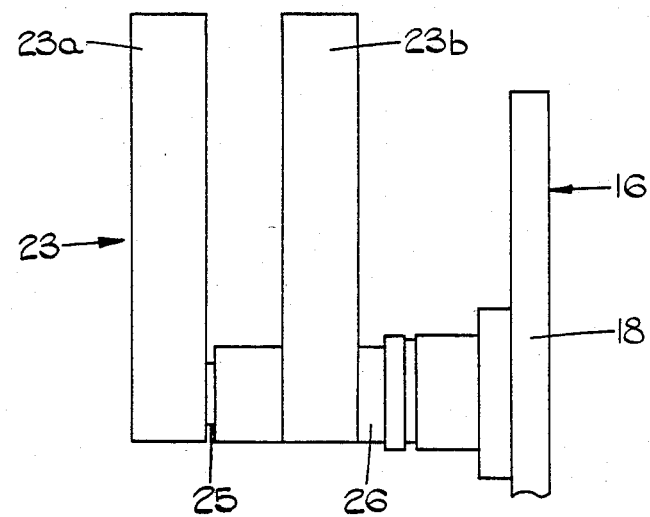
FIGS. 3 and 4 are detailed views of various parts of the apparatus.

As can be seen to advantage in FIG. 3, the pressure member 23 is divided into two separate parts 23a and 23b which are spaced apart so that they contact the sachet S at different places thereon. The part 23a is secured to one end of a shaft 25 which extends rotatably through the rotor plate 18, while the part 23b is mounted on a sleeve 26 which surrounds the shaft 25 and which also passes rotatably through the plate 18. The shaft 25 and the sleeve 26 are capable of relative rotation, so that the two parts 23a and 23b are able to pivot independently of one another.

Figure 4:
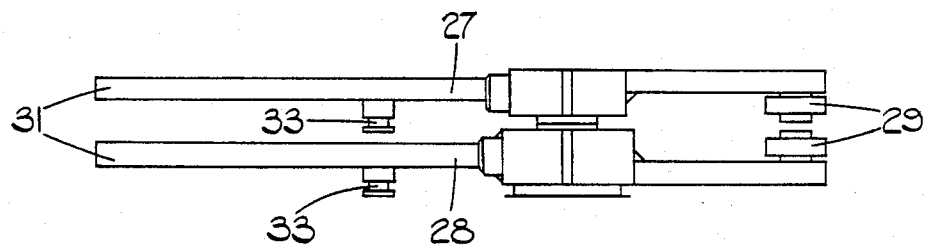

On the opposite side of the rotor plate 18, the shaft 25 and the sleeve 26 are coupled to respective operating levers 27 and 28, shown in detail in FIG. 4. At one end thereof, each of the levers 27 and 28 carries a roller 29 which engages a cam surface 30 fixed to the frame 21 and surrounding the rotor shaft 19. The opposite end of each lever 27, 28 extends beyond the outer periphery of the rotor plate 18 and is provided with a flag 31, the purpose of which will be explained later. Tension springs 32 (only one shown) are connected between respective lugs 33 on the operating levers and further lugs (34) (see FIG. 1) on the rotor plate 18, and act on the one hand to bias the rollers 29 into contact with the cam surface 30 and on the other hand to urge the parts 23a and 23b towards the pressure member 22.

As can be seen to advantage in FIG. 1, the configuration of the cam surface 30 is such that the pressure member 23 is held away from the pressure member 22 when each carrier device 17 is positioned at the receiving station 10, but upon rotation of the rotor 16 in the direction of arrow Z both of the parts 23a and 23b pivot towards the pressure member 22. At the receiving station 10, a sachet S delivered from the packaging and sealing machine 11 falls between the pressure members 22, 23 and comes to rest on a support 35 fixed to the frame 21. As the rotor 16 is rotated, the sachet is gripped and compressed between the pressure members under the force of the springs 32, as indicated at 17' in FIG. 1. If the sachet is not defective in its sealing, the amount by which it can be compressed will be limited by the air pressure in its interior. Accordingly, (the pressure member parts 23a, 23b and hence the operating levers 27, 28 will be halted at a predetermined position in their pivotal movement when the sachet becomes compressed by this amount. In contrast, if the sachet has a defective seal, the air in its interior will be able to escape and consequently the amount by which it can be compressed will not be limited in the above-described manner. Therefore, the pressure member parts 23a, 23b and the operating levers 27, 28 will be able to pivot beyond the aforesaid predetermined position. The present apparatus makes use of this effect to reject those sachets having a defective seal in the following manner.

At the detection station 12 there is disposed an optical detector 36 which operates by means of the breaking of a light beam. When the rotor 16 has indexed the carrier 17 to the station 12, if the levers 27, 28 have been unable to pivot beyond the aforesaid predetermined position, then the flags 31 thereon will be positioned just outside the light beam, as indicated in broken line at 31' in FIG. 1. If however either one of the levers has pivoted beyond the predetermined position, the flag 31 will break the light beam as indicated in chain-dotted line at 31". Such breaking of the light beam causes the detector 36 to produce an output signal to operate a rejection device 36 to produce an output signal to operate a rejection device 37 at the rejection station 13, which includes a lever 38 pivotally mounted on the frame 21. When the carrier device 17 carrying the defective sachet reaches the rejection station 13, a piston and cylinder assembly 39 is actuated to pivot the lever 38 in a clockwise direction as viewed in FIG. 1, thereby causing an abutment 40 on the free end of the lever 38 to engage the ends of the operating levers 27, 28 and pivot the latter in a direction to move the pressure member 23 away from the pressure member 22. The sachet carried by the carrier device 17 is thereby released and falls under gravity onto a reject conveyor (not shown) disposed beneath the rotor 16. A limit switch 41 adjacent the opposite end of the lever 38 prevents the rotor 16 from being further indexed until the lever 38 has returned to its rest position, as illustrated in FIG. 1.

As indicated above, if the sachet has been sealed properly, it will not operate the detector 36. Under this condition, the carrier device 17 carries the sachet past the rejection station 13 to the delivery station 14. As the rotor 16 rotates to move the carrier device 17 to the delivery station, the cam surface 30 causes the operating levers 27, 28 to pivot so as to move the pressure member 23 away from the pressure member 22. The sachet now rests upon the pressure member 22, which is disposed generally horizontally at this time. A cam-operated stripper arm 42 positioned at the delivery station then moves the sachet off the pressure member 22 and onto the check-weigher 15.

From the above description, it will be manifest that the sachet is subjected to compression between the pressure members 22 and 23 during the whole time taken for the rotor 16 to index the carrier device 17 from the receiving station 10 to the detection station 12. Accordingly, even if the sachet has only a pin-hole leak, sufficient air can escape from the sachet before the carrier device reaches the detection station to enable the leak to be detected. In addition, since the sachet is compressed by the force of the springs 32 only, there is little danger of its conents being damaged during the seal-testing operation. In this regard, it will be appreciated that the tension in the springs 32 lessens as the pressure member 23 pivots into contact with the sachet.

The testing apparatus may also include a facility for detecting whether or not the sachet is of a proper length. To this end, a pair of optical detectors 43 and 44 (similar to the detector 36 described above) may be positioned in spaced relation radially of the rotor 16 to perform a detection operation on the sachet at the same time as the detector 36 performs its detection on the flags 31. When the sachet is received by the carrier device 17 at the receiving station 10, the support 35 ensures that its lower end occupies a predetermined radial psotion. Accordingly, if the sachet is of the proper length then its upper end will also occupy a predetermined radial position. The detectors 43 and 44 operate to check whether or not this is in fact the case and are positioned such that, if the sachet is of the correct length, then only the radially inner detector 43 is operated. If the sachet is too long then it will activate both detectors 43 and 44, whereas if it is too short then neither detector will be operated. In each of the last two cases a fault signal is supplied to the rejection device 37 which operates in the above-described manner to reject the defective sachet when it reaches the rejection station 13.

I claim:

1. Apparatus for seal-testing packages, comprising a receiving station at which said packages are received for testing, a delivery station at which the tested packages are delivered from the apparatus, at least one carrier device operative to receive said packages at the receiving station and carry same to the delivery station, the or each carrier device including a pair of opposed pressure members between which a package is received in use, moving means operative during movement of the or each carrier device between the receiving and delivery stations to effect relative movement between said pair of opposed pressure members such that said package is compressed therebetween, and detection means operative to produce an output signal in the event that said pair of members are moved towards one another by more than a predetermined amount by the time the respective carrier device reaches the delivery station.

2. An apparatus as set forth in claim 1 including a plurality of carrier devices which are moved in succession along a closed path.

3. An apparatus as set forth in claim 2 wherein the carrier devices are carried by a rotor, with the receiving and delivery stations being angularly spread about the rotation axis of the rotor.

4. An apparatus as set forth in claim 1 wherein said moving means includes a fixed cam surface, a cam follower operatively coupled to the or each carrier device so as to offset relative movement between said pressure members as it moves along said cam surface.

5. An apparatus as set forth in claim 1 wherein in each carrier device one of the pair of pressure members is fixed, with the other being movable towards and away therefrom.

6. An apparatus as set forth in claim 5 wherein one of the pressure members is divided into two independently movable parts positioned to engage a package and wherein said detection means is operative to produce said output signal in the event that either of said parts moves by more than a predetermined amount.

7. An apparatus as set forth in claim 1 wherein said detection means comprises an optical detector and wherein each carrier device includes an indicator member having a part which is arranged to break a light beam of the detector in the event that the pressure members move towards one another by more than said predetermined amount.

8. An apparatus as set forth in claim 1 which additionally comprises a rejection station, separable from the delivery station, at which a rejection device moves the pressure members of each carrier device away from one another to release the package therebetween in response to said output signal from said detection means.

9. An apparatus as set forth in claim 8 wherein the rejection station is disposed between the receiving station and the delivery station in the direction of travel of the carrier device.

10. An apparatus as set forth in claim 9 wherein the rejection device includes a member past which each carrier engages at least one of the pressure members to move the latter apart in response to said output signal from said detection means.

* * * * *